United States Patent
Young et al.

(10) Patent No.: US 7,263,362 B1
(45) Date of Patent: *Aug. 28, 2007

(54) SYSTEM AND METHOD FOR DEPLOYING MULTI-FUNCTION ACCESS POINTS IN A DATA NETWORK

(75) Inventors: Steven Jay Young, Los Gatos, CA (US); Todd Krein, San Jose, CA (US)

(73) Assignee: Digeo, Inc., Kirkland, WA (US)

( * ) Notice: Subject to any disclaimer, the term of this patent is extended or adjusted under 35 U.S.C. 154(b) by 794 days.

This patent is subject to a terminal disclaimer.

(21) Appl. No.: 10/262,269

(22) Filed: Sep. 30, 2002

(51) Int. Cl.
*H04Q 7/20* (2006.01)

(52) U.S. Cl. .............. 455/450; 455/45; 455/452.1; 455/453; 455/41.2; 455/41.3; 455/464; 370/338; 379/93.05

(58) Field of Classification Search ..... 455/450–452.1, 455/41.2–41.3, 464–466, 552.1, 554.1, 554.2, 455/555; 370/338, 352–355; 709/251; 379/93.05; 725/74, 78
See application file for complete search history.

(56) References Cited

U.S. PATENT DOCUMENTS

| | | | | |
|---|---|---|---|---|
| 5,574,964 A * | 11/1996 | Hamlin | ............... | 725/78 |
| 5,598,401 A * | 1/1997 | Blackwell et al. | .......... | 370/385 |
| 5,912,963 A * | 6/1999 | Begeja et al. | .......... | 379/221.01 |
| 5,960,066 A * | 9/1999 | Hartmann et al. | ....... | 379/93.08 |
| 5,999,598 A * | 12/1999 | Henrick et al. | ......... | 379/93.07 |
| 6,064,653 A * | 5/2000 | Farris | ................. | 370/237 |
| 6,084,872 A * | 7/2000 | Munson et al. | ............. | 370/351 |
| 6,091,722 A * | 7/2000 | Russell et al. | .............. | 370/352 |
| 6,115,460 A * | 9/2000 | Crowe et al. | .......... | 379/211.02 |
| 6,122,255 A * | 9/2000 | Bartholomew et al. | ..... | 370/237 |
| 6,141,341 A * | 10/2000 | Jones et al. | ................. | 370/352 |
| 6,266,340 B1 * | 7/2001 | Pickett et al. | ............... | 370/442 |
| 6,295,293 B1 * | 9/2001 | Tonnby et al. | .............. | 370/389 |
| 6,311,288 B1 * | 10/2001 | Heeren et al. | ................ | 714/4 |
| 6,339,593 B1 * | 1/2002 | Kikinis | ....................... | 370/352 |
| 6,363,065 B1 * | 3/2002 | Thornton et al. | ........... | 370/352 |
| 6,389,005 B1 * | 5/2002 | Cruickshank | .............. | 370/352 |
| 6,466,550 B1 * | 10/2002 | Foster et al. | ................ | 370/261 |
| 6,477,164 B1 * | 11/2002 | Vargo et al. | ................ | 370/356 |
| 6,526,581 B1 * | 2/2003 | Edson | ........................ | 725/74 |
| 6,574,216 B1 * | 6/2003 | Farris et al. | ................ | 370/352 |
| 6,577,622 B1 * | 6/2003 | Schuster et al. | ........... | 370/352 |
| 6,580,710 B1 * | 6/2003 | Bowen et al. | ............. | 370/353 |
| 6,628,666 B1 * | 9/2003 | Pickering et al. | ........... | 370/468 |
| 6,687,374 B2 * | 2/2004 | Leuca et al. | .......... | 379/413.04 |

(Continued)

OTHER PUBLICATIONS

Cisco IAD1101 Integrated Access Device, pp. 1-5, Aug. 21, 2000.*

*Primary Examiner*—Steve M. D'Agosta
(74) *Attorney, Agent, or Firm*—Kory D. Christensen; Stoel Rives LLP

(57) ABSTRACT

An apparatus is described comprising: telephony circuitry electrically coupled to a telephone network, the telephony circuitry to transmit and receive telephone signals over the local telephone network; a first network controller electrically coupled to the telephone network, the network controller to transmit and receive digital data signals over the local telephone network; and a second network controller communicatively coupled to one or more external devices, wherein the second network controller provides access to the local telephone network to the one or more external devices via a first communication interface coupling the second network controller with the first network controller.

29 Claims, 7 Drawing Sheets

U.S. PATENT DOCUMENTS

| | | | |
|---|---|---|---|
| 6,711,138 B1 * | 3/2004 | Pai et al. | 370/257 |
| 6,778,646 B1 * | 8/2004 | Sun | 379/93.05 |
| 6,868,080 B1 * | 3/2005 | Umansky et al. | 370/354 |
| 6,877,043 B2 * | 4/2005 | Mallory et al. | 709/251 |
| 6,944,151 B1 * | 9/2005 | Menard | 370/353 |
| 6,980,638 B1 * | 12/2005 | Smith et al. | 379/221.01 |
| 2002/0101817 A1 * | 8/2002 | Teixeira | 370/217 |
| 2002/0114325 A1 * | 8/2002 | Dale et al. | 370/355 |

* cited by examiner

SYSTEM AND METHOD FOR DEPLOYING MULTI-FUNCTION ACCESS POINTS IN A DATA NETWORK

BACKGROUND

1. Field of the Invention

This invention relates generally to the field of data networking. More particularly, the invention relates to a multi-function access point deployed within a data network.

2. Description of the Related Art

Various standards have been developed to allow the transmission of high speed data over existing home wiring. For example, the home phone networking alliance ("HPNA") has developed standards for delivering high speed Internet Protocol ("IP") data over telephone lines in the home. The current specification, HPNA 2.0, provides for a 10 Mbps data network over existing RJ-11 telephone wiring. A variant of HPNA is HPNA-C in which similar protocols are used, but the home's coaxial wiring is used as a physical media rather than phone lines. Similar digital networks have been developed to use the home's AC wiring within the 2.4 GHz and 5 GHz frequency bands.

In addition, a variety of wireless home networking standards have been developed over the past several years. For example, the IEEE 802.11b standard specifies a wireless networking protocol with a data transfer rate of up to 11 Mbps, whereas the IEEE 802.11a standard specifies a protocol with a data transfer rate of up to 54 Mbps. Computers and peripherals equipped with wireless adapters connect to the wireless network through a wireless "access point." The wireless access point is also typically coupled to a wired LAN using an integrated Ethernet controller and/or to a high speed Internet connection such as a DSL or cable modem.

Bandwidth decreases as a computer moves further away from an access point. Thus, in order to guarantee some minimum level of bandwidth, multiple access points must be distributed throughout a particular area (e.g., within a user's home or office). When multiple access points are distributed in this manner, computers and peripherals connect to those access points which provide the highest bandwidth.

Given the fact that the same telephone wiring is used for both voice and high speed data in an HPNA network, it would be beneficial to develop a telephony device which includes both standard telephony technology and access point technology, thereby allowing external devices to connect to the HPNA network via the access point technology.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Prior to describing embodiments of the system and method for deploying multi-function access points in a data network, which is the focus of this application, an overview of an exemplary networking architecture is provided. Embodiments of the exemplary networking architecture are set forth in the co-pending application entitled MULTIMEDIA AND COMPUTING SYSTEM, filed Sep. 1, 2000 (Ser. No. 09/653,964), which is assigned to the assignee of the present application and which is incorporated herein by reference. It should be noted, however, that many of the specific details of the networking architecture set forth below are not necessary for implementing the underlying principles of the invention.

System Overview

Figure 1:
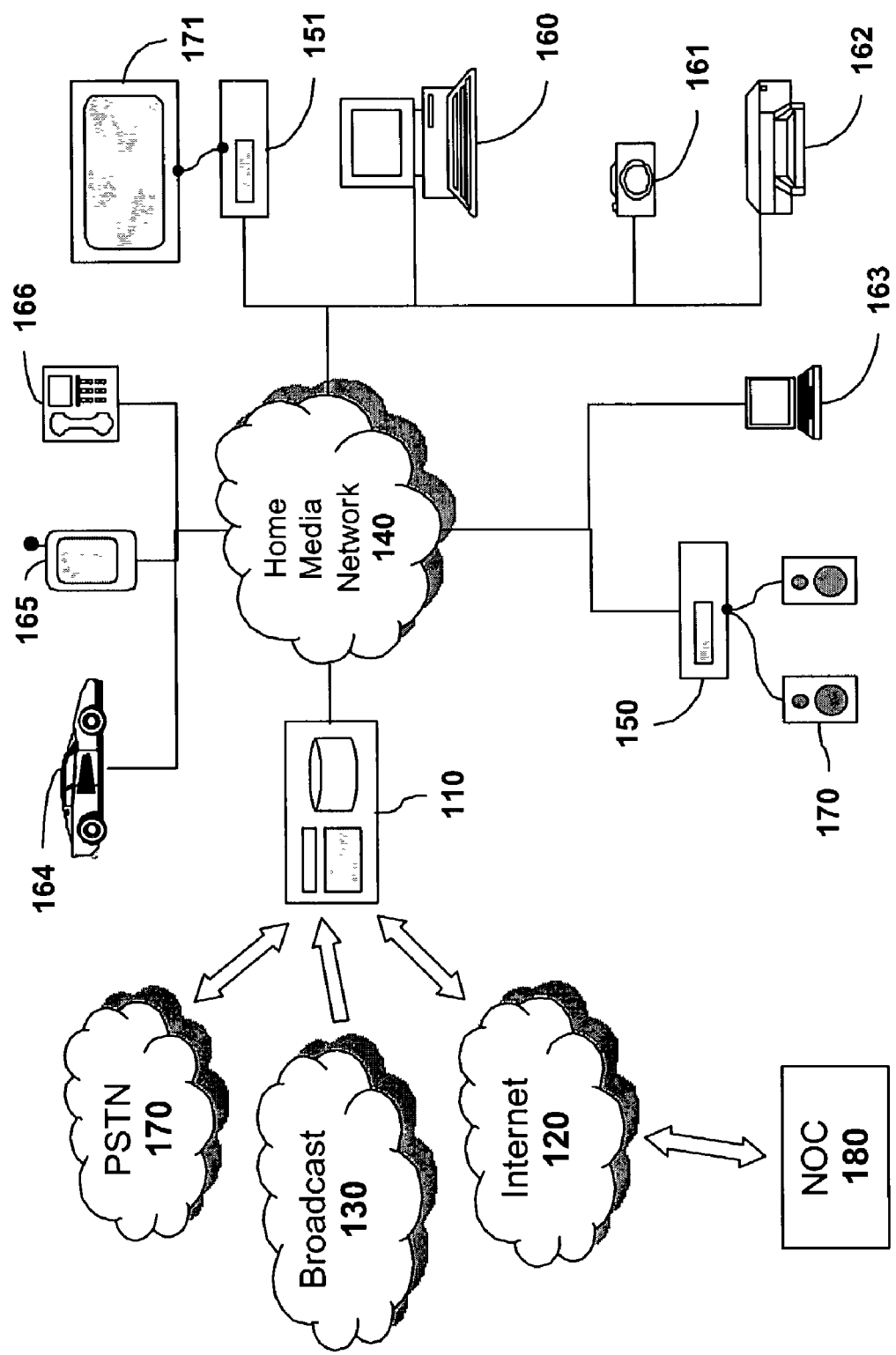
FIG. 1 illustrates a network architecture for implementing embodiments of the invention.

As illustrated in FIG. 1, in one embodiment of the invention, a digital media server 110 equipped with a processor and a mass storage device acts as a central repository for decoding, storing and distributing multimedia content and data. More particularly, the digital media server 110 coordinates multimedia content from Internet communication channels 120 (e.g., DSL, cable Internet), broadcast communication channels 130 (e.g., digital/analog cable, satellite), and/or Public Switched Telephone Network ("PSTN") communication channels 170 (i.e., standard telephone) to provide a stable, real-time home media network 140 for a plurality of network devices 150-151, 160-166.

Numerous digital and analog devices may be configured to communicate with the home media server 110 over the home media network 140. By way of example, and not limitation, these include personal computers 160, cameras or digital camcorders 161, printers 162, notebook computers 163, automotive audio/video systems 164, cell phones or personal digital assistants 165, standard telephones 166 (including fax machines), home security systems (not shown); and/or home climate control systems (not shown).

In one embodiment, complex multimedia and data processing functions such as tuning to selected channels, buffering television programming, recording of specified television programs/music, storing phone numbers and personal data, connecting to remote network sites, etc., is performed at the media server 110, rather than at the individual network devices 150-151; 160-166. As such, these devices 150-151; 160-166 may be manufactured relatively inexpensively. For example, multimedia nodes 150, 151 may be equipped with just enough processing power and memory to receive and play back a multimedia signal, with storage and control (e.g., tuning) functions offloaded to the home media server 110. Similarly, a telephone 166 may be designed with nothing more than a low power microcontroller coupled to an RF transmitter, with telephony functions and contact data storage provided by the home media server 110. In addition, because these network devices 150-151; 160-166 do not require as much circuitry, they will be lighter than currently-existing devices, and will consume less power.

In one embodiment, the primary communication medium over which the home media server 110 and the various devices 150-151, 160-166 communicate is wireless RF (e.g., via network module 240), with terrestrial transport connections such as Ethernet reserved for devices which are not within RF transmission range. Moreover, certain devices which require a substantial amount of home media network 140 bandwidth (e.g., high definition television 171), and/or devices which are in close proximity to the media server 110 may be configured to communicate over terrestrial transports, depending on the requirements of the particular configuration.

In one embodiment, a user may store his/her CD collection on the mass storage device 230 of the home media server 110. Upon storing content from each CD, the home media server 110 may query a CD database (either locally or on a remote server) and download title and track information (or other information) used to identify/index each CD and each track. Once the CD content is stored on the media server 110, it may be accessed and played back from any device coupled to the home media network 140.

In one embodiment, the media server 110 also provides personal video recorder ("PVR") functionality for each of the video display devices coupled to the home media network. For example, in one embodiment, several concurrent, real-time multimedia streams transmitted form cable or satellite providers may be buffered on the mass storage device of the media server 110. Multiple users may pause, fast-forward, and/or rewind buffered television programming from multiple different rooms in the user's home. Long term storage of television programs, such as those provided by a conventional VCR, are also provided by the media server 110.

Telephony Embodiments

Figure 2:
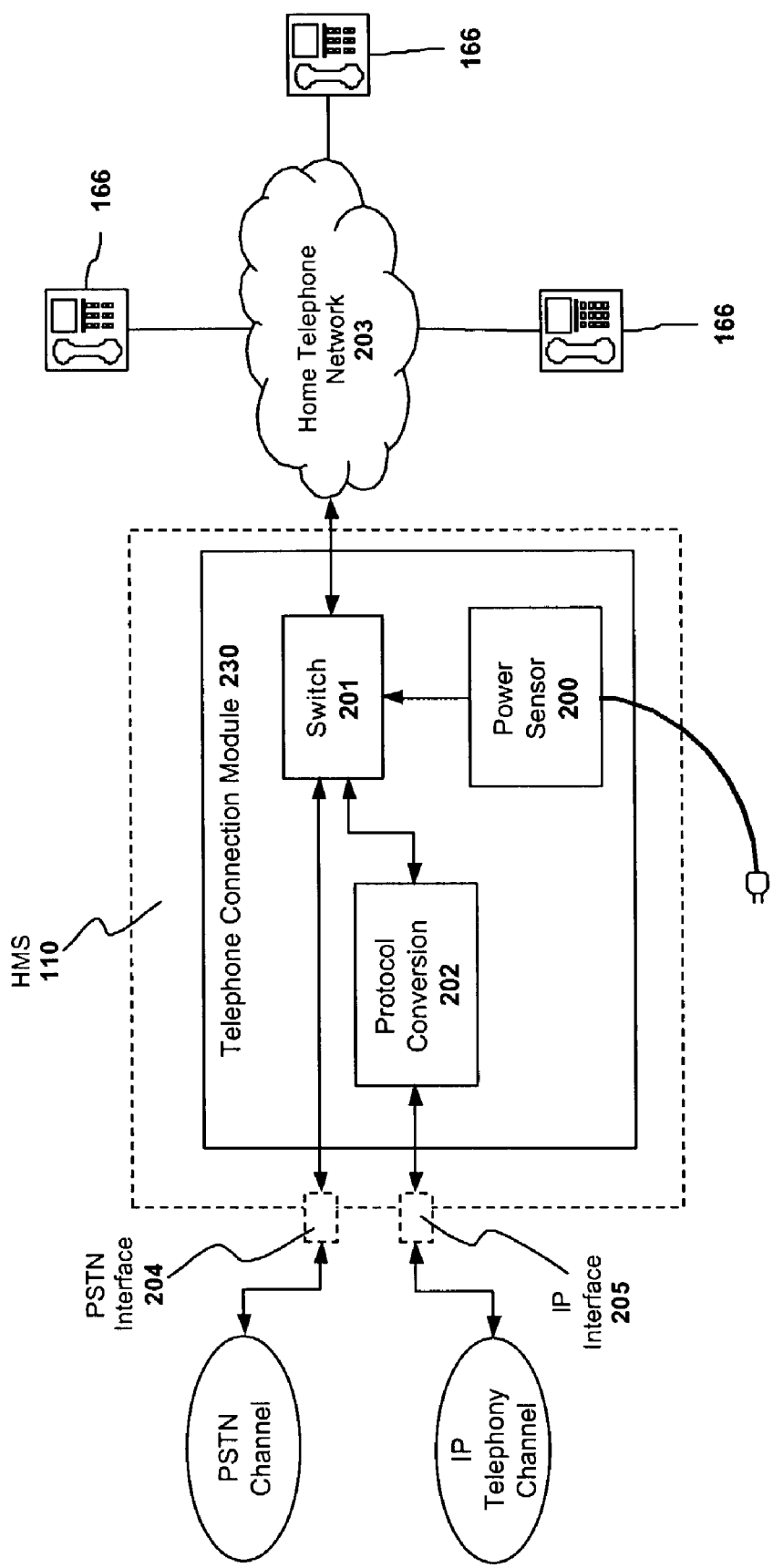
FIG. 2 illustrates one embodiment of a telephone connection module for switching between PSTN channel and an IP telephony channel.

Filed concurrently herewith is an application entitled SYSTEM AND METHOD FOR COORDINATING BETWEEN MULTIPLE TELEPHONY CHANNELS, which is assigned to the assignee of the present application and which is incorporated herein by reference (hereinafter "Telephony Coordination Application"). FIG. 2 illustrates one embodiment of the invention described in the Telephony Coordination Application which includes a telephony connection module 230 comprised of a protocol conversion module 202, a power sensor 200 and a switch 201. The power sensor 200 provides a first switching signal to the switch 201 when power to the home media server 110 drops below a threshold value. Conversely, the power sensor 200 provides a second switching signal to the switch 201 when power to the home media server 110 rises above a specified threshold value.

In response to the first switching signal the switch 201 couples the standard PSTN channel to the home telephone network 203, thereby providing primary line service across the home telephone network 203 in the event of a power outage. In response to the second switching signal, the switch 201 couples the IP telephony channel to the home telephone network 203, thereby providing IP telephony service when the home media server 110 is powered.

As indicated in FIG. 2, the PSTN channel is coupled to the home media server 110 via a PSTN interface 204 (e.g., an RJ-11 interface). Likewise, the IP telephony channel is coupled to the home media server 110 via an IP interface 205 (e.g., a coaxial cable from the cable company).

In one embodiment, the home telephone network 203, at the physical layer, employs the standard PSTN wiring within the user's home (i.e., RJ-11 wiring). Alternatively, or in addition, any of the communication channels of the home media network 140 described herein may be employed at the physical layer (e.g., coaxial cable, wireless, . . . etc).

Regardless of the particular physical layer employed for the home telephone network 203, in one embodiment, the Home Phoneline Network Alliance ("HPNA") standard is employed above the physical layer. As mentioned above HPNA describes a protocol for delivering IP data over telephone lines in the home.

Accordingly, when the home media server 110 is powered, and the switch 201 couples the IP telephony channel to the home telephone network 203, IP packets from the IP telephony channel are routed to the various telephony devices 166 using the HPNA standard. In one embodiment, if the network protocol stack employed by the IP telephony channel is not directly compatible with HPNA, a protocol conversion module 202 initially converts the packetized data to an HPNA-compatible format. For example, at the data-link layer, the IP packets from the IP telephony connection may be received within a different frequency block than the frequency block within which HPNA operates. As such, the IP telephony signal may need to be frequency-shifted before being supplied to the home telephony network 203 (i.e., if HPNA is used as the IP transmission protocol). In addition, if the IP telephony connection requires a different codec, or uses a different type of quality of service (QoS), the protocol conversion module 502 may be required to convert these features of the signals. Similarly, the protocol conversion module may convert between different packet sizes employed by HPNA and the IP connection.

Figure 3:
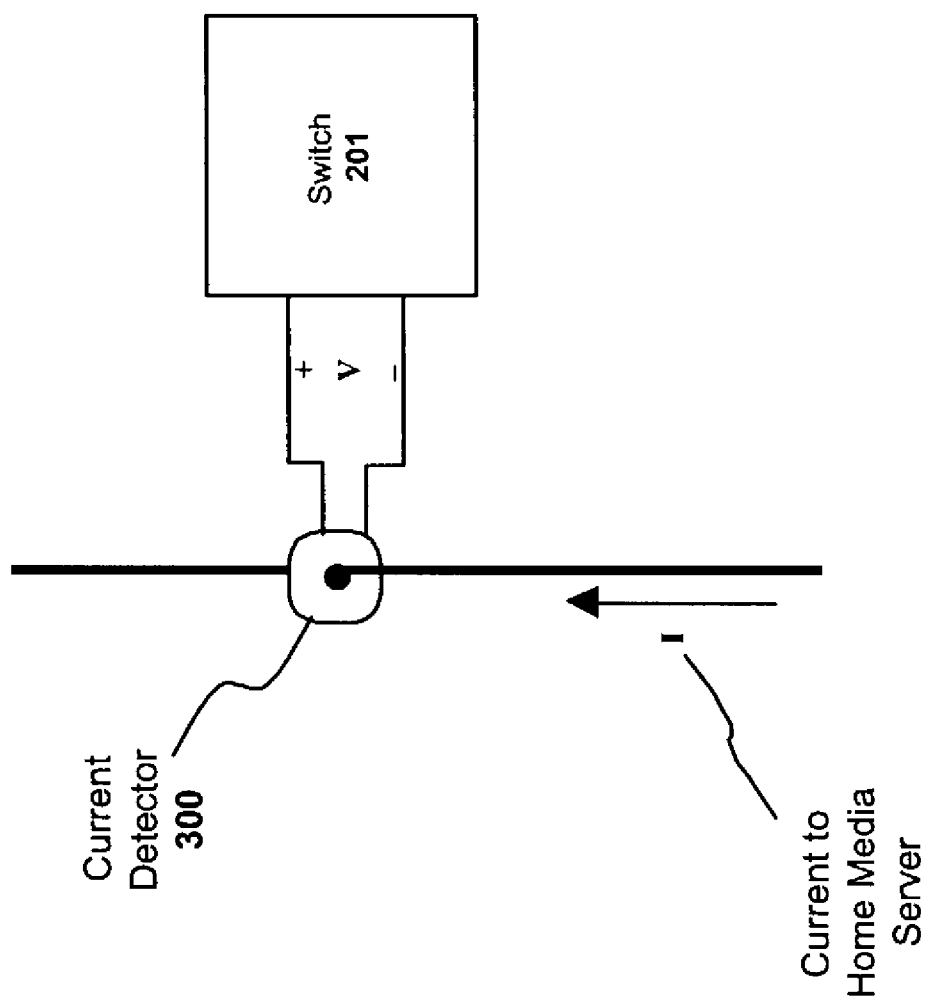
FIG. 3 illustrates a power sensor according to one embodiment of the invention.

In one embodiment, the power sensor 200 is comprised of a current detector 300 such as that illustrated in FIG. 3. The current detector 300 outputs a voltage V which is proportional to the current 301 being used by the home media server 110. Thus, if the current drops below a specified value, indicating a concomitant decrease in power consumption, then the voltage generated by the current sensor 300 drops below a corresponding voltage level. In response, the switch 201 couples the standard PSTN channel to the home telephone network 203, thereby providing primary line service across the home telephone network 203. Similarly, when power is restored and the voltage level rises above some specified value, the switch 201 couples the IP telephony channel to the home telephone network 203. It should be noted that various alternate circuits for switching between the IP telephony channel and the PSTN channel may be employed while still complying with the underlying principles of the invention (e.g., a relay; a Hall sensor; a voltage drop over a small sensing resistor; . . . etc).

For example, in one embodiment, the "switch" is a simple relay, normally closed. That is, if no power is available to the home media server 110, the relay falls closed, and connects to the PSTN. If power is available, the relay is energized, and thus disconnects from the PSTN. When disconnected from the PSTN, the IP telephony connection is employed.

In one embodiment, both the PSTN channel and the IP telephony channel may be coupled to the home telephone network 203 at the same time. For example, because HPNA operates at frequencies well above those used by PSTN, both PSTN and IP telephony transmitted via HPNA may share the same transmission medium. Thus, in this embodiment, instead of employing a switch 401 to select between PSTN and IP telephony at the home media server 110, a power sensor (or other sensor to detect the HPNA signal) and switch may be provided at each of the telephony devices 166 within the user's home.

Figure 4:
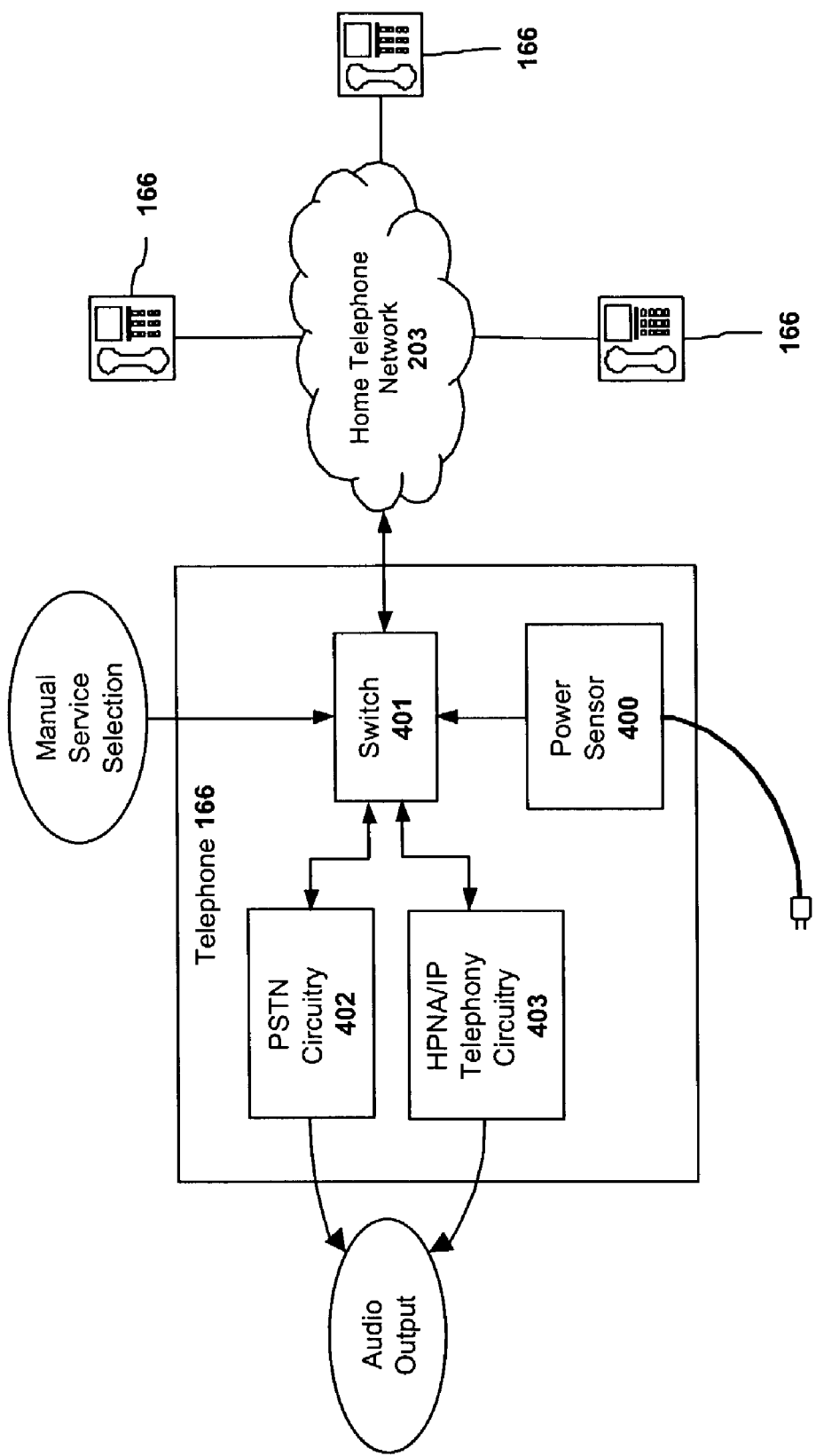
FIG. 4 illustrates a telephone equipped with a power sensor and a switch for switching between different telephony communication channels.

As illustrated in FIG. 4, one embodiment of such a telephony device 166 is comprised of a power sensor 400 to detect whether the telephony device 166 is powered (e.g., plugged in to an AC outlet). The power sensor 400 provides a first switching signal to the switch 401 when power to the telephony device 166 drops below a threshold value and a second switching signal to the switch 401 when power provided to the telephony device 166 rises above a specified threshold value.

In response to the first switching signal the switch 401 couples the home telephone network 203 to PSTN circuitry/logic 402 within the telephony device 166, thereby coupling the primary line signal to the telephony device 166. In response to the second switching signal, the switch 401 couples the home telephone network 203 to IP telephony circuitry/logic 403 within the telephony device 166, thereby coupling the IP telephony signal to the telephony device 166. In one embodiment, the IP telephony circuitry comprises HPNA circuitry to communicate over the home telephony network 203 according to the HPNA protocol.

It should be noted that the switches in the home media server 110 and/or the individual telephony devices 166 may be triggered by sensing phenomena other than power consumption. For example, in one embodiment, IP signal detection circuitry/logic or HPNA signal detection circuitry/logic is provided, either in lieu of, or in addition to the power sensor 200, to detect whether an IP telephony signal and/or an HPNA signal is present. If the IP telephony signal or HPNA signal is present, then the switch 201 provides the signal to the home telephone network 203; if not, then the switch 201 provides the PSTN signal to the home telephone network 203.

As used herein, the term "IP telephony" may refer to any telephony system in which audio data is digitized, packetized, and transmitted from a source to a destination. That is, "IP telephony" is not limited to telephony using the Internet Protocol, "IP." Various alternate protocols for packetizing data may be employed while still complying with the underlying principles of the invention.

Access Point Embodiments

Figure 5:
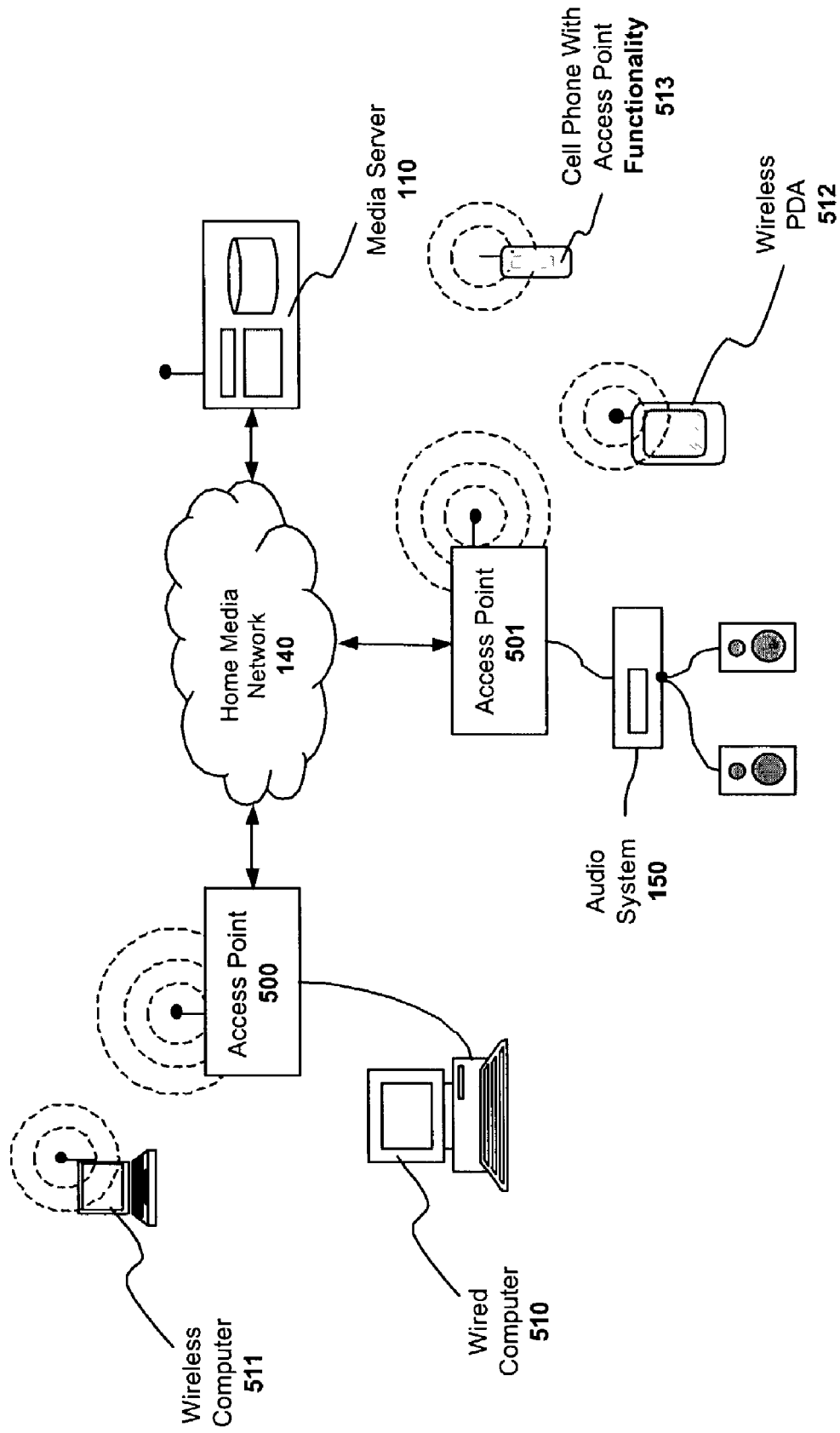
FIG. 5 illustrates one embodiment of a home media network in which access points are employed to extend the range of the home media server.

In one embodiment, access points are distributed throughout the home media network 140 to extend the range and functionality of the media server 110 and/or other devices coupled to the home media network 140. One such embodiment is illustrated in FIG. 5, which shows a first access point 500 linking one computer 511 to the home media network 140 via a wireless communication channel such as, for example, an 802.11a, 802.11b, or 802.11 g channel, and linking a second computer 510 to the home media network 140 via a wired communication channel (e.g., using Ethernet, USB, Firewire™ . . . etc). A second access point 501 is shown wirelessly linking a personal digital assistant ("PDA") 512 to the home media network 140 using, for example, a short range wireless standard such as Bluetooth, and linking an audio system 150 to the home media network 140 via an audio output. As will be described in greater detail below, in one embodiment, the audio system renders audio stored on the home media server 110 (e.g., CD content stored on the media server's mass storage device). Also illustrated in FIG. 5 is a cellular telephone configured to communicate over cellular networks and the home media network 140 via the access point 501 (e.g., using Bluetooth).

Although described below in the context of the "home telephone network," access points may be coupled to any portion of the home media network 140 and may be configured to process any type of data transmitted from the media server 110. For example, the access points may be communicatively coupled to the user's coaxial network, telephone network, AC powerline network, or any combination thereof. The access points may also be coupled wirelessly to the home media server 110. Moreover, in one embodiment, access points are equipped with multimedia decoding capabilities for decoding the audio and/or video content stored on the home media server 110.

In one embodiment, telephony devices such as fax machines, PSTN or IP telephones, . . . etc, are configured with access point functionality. Two multi-function telephone/access points, 600 and 700, are illustrated in FIGS. 9 and 10, respectively. The telephone/access points 600, 700 are shown communicating over the home telephone network 203 with additional telephone/access points 620 and 630 and a media server 110.

Figure 6:
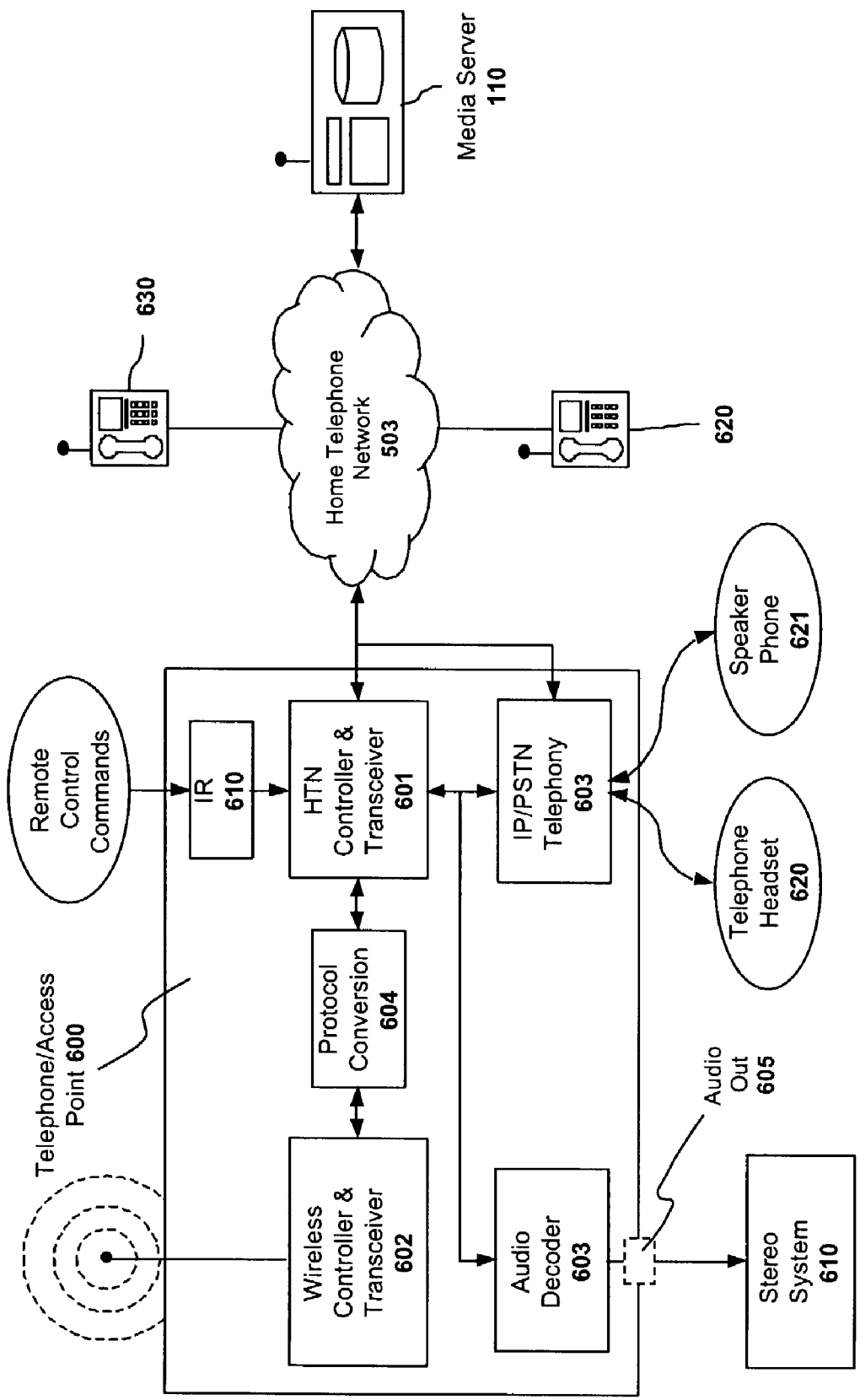
FIG. 6 illustrates one embodiment of a multi-function telephone/access point.

The telephone/access point 600 illustrated in FIG. 6 includes a home telephone network controller/transceiver 601 which supports communication over the home telephone network 203 (e.g., at the physical and data-link layers of the OSI networking model). As mentioned above, in one embodiment, the controller/transceiver 601 implements the HPNA protocol over the home telephone network (e.g., HPNA 3.0).

In addition, a wireless controller/transceiver 602 enables communication with wireless computers and other wireless devices according to a particular wireless communication protocol. In one embodiment, the wireless protocol employed is a version of the 802.11 standard (e.g., 802.11a, 802.11b, 802.11c, etc). However, the underlying principles of the invention are not limited to any specific wireless protocol.

In one embodiment, a protocol conversion module 604 couples the home telephone network controller/transceiver 601 with the wireless controller/transceiver 602, converting between the wireless protocol and the home telephone network protocol. Depending on the network configuration, the protocol conversion module 604 may operate at different networking layers. For example, in one embodiment, the protocol conversion module 604 operates as a bridge at the data-link network layer (layer 2 of the OSI networking model). Thus, in this embodiment, it is assumed that the wireless network and the home telephone network use a consistent protocol at the network layer. For example, in one embodiment, the TCP/IP protocol is employed at the network and transport layers, respectively, for both the wireless network and the home telephone network 203. Alternatively, the protocol conversion module 604 may operate as a router at the network layer (layer 3 of the OSI model) or as a gateway at the network layer and above (layer 3 through layer 7 of the OSI model). The underlying principles of the invention are not limited to any particular type of protocol conversion.

The illustrated telephone/access point 600 also includes a telephony module 603 for enabling audio telephony communication over the home telephony network 203. In one embodiment, the telephony module 603 supports both standard PSTN and IP telephony services and selects between the services as described above with respect to FIG. 4. For example, the telephony module 601 may switch between IP and PSTN service upon detecting which service is available.

The telephone/access point 600 illustrated in FIG. 6, also includes a telephone headset 620 and/or speaker phone 621 coupled to the IP/PSTN telephony module 603 for enabling audio communication over the home telephone network 203.

The telephone/access point 600 includes an audio decoder 603 for decoding/processing audio content transmitted over the home telephone network 203. An audio output port 605 couples the audio decoder 603 to a stereo system 610 or other type of audio amplifier. The audio output port 605 may be a digital output port or an analog output port (e.g., an analog RCA port). If the output port 605 is an analog output, then the audio decoder 603 includes digital-to-analog conversion logic to convert the digital audio signal to an analog audio waveform.

The audio decoder 603 employs a codec to decode the audio content. In one embodiment, the codec is the MPEG Audio Layer 3 codec ("MP3"). However, various other compression codecs may be employed while still complying with the underlying principles of the invention.

In one embodiment, the telephone/access point 600 includes an infrared sensor 610 to receive and process control signals transmitted from a remote control device. The infrared sensor 610 provides the control signals to the telephone network controller/transceiver 601 which transmits the control signals over the telephone network 203 to the home media server 110. Thus, using the remote control device the user may control the content/data transmitted from the home media server 110. For example, the user may specify audio tracks to be transmitted from the mass storage device of the home media server 110.

Figure 7:
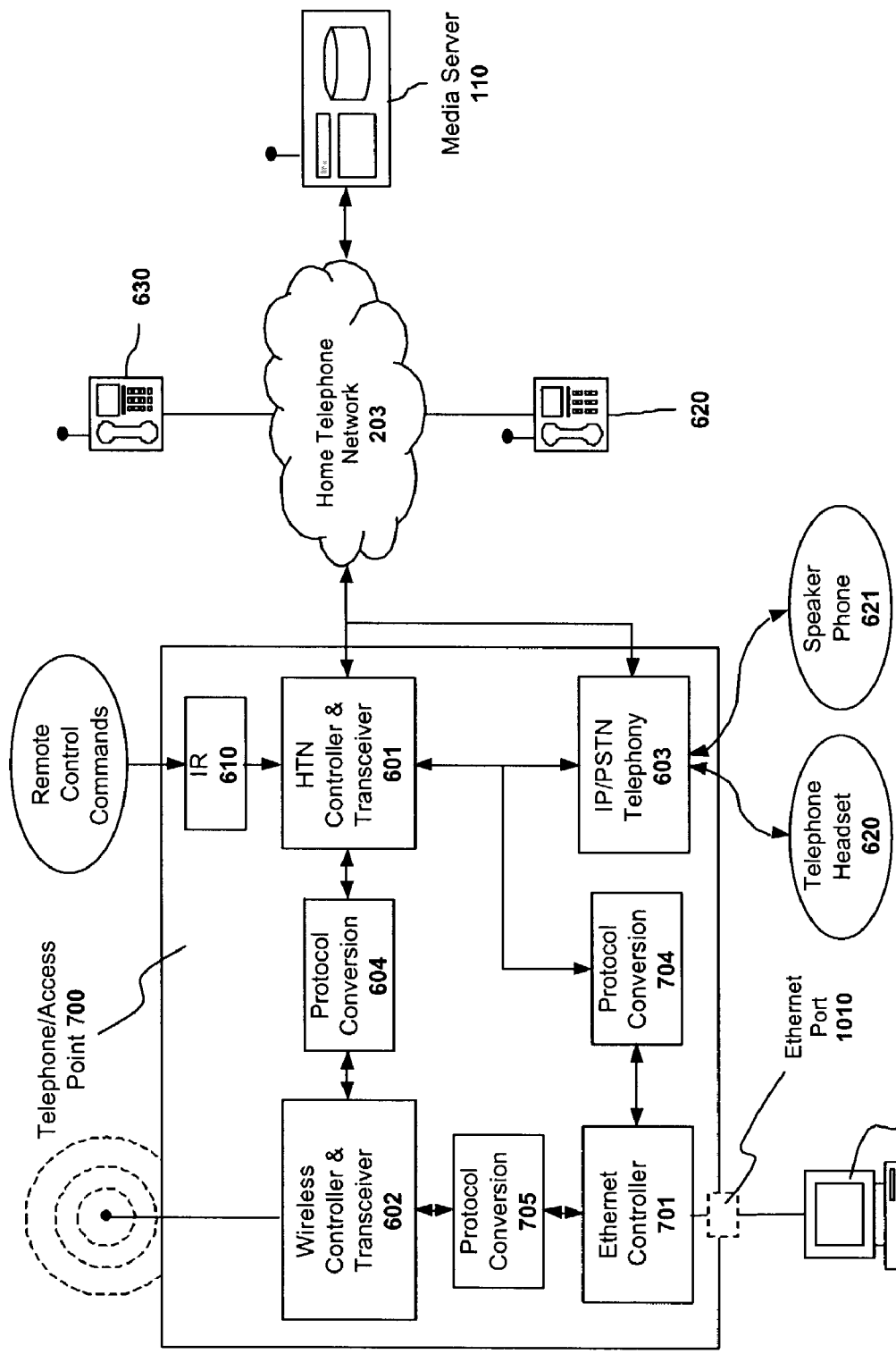
FIG. 7 illustrates another embodiment of a multi-function telephone/access point.

FIG. 7 illustrates an embodiment of a telephone/access point 700 which also includes an Ethernet controller 701 and an Ethernet port 710 (e.g., an RJ-45 port). Thus, personal computers 510 and other devices equipped with Ethernet ports/controllers may be directly coupled to the telephone/access point 700, thereby preserving wireless bandwidth. A first protocol conversion module 704 converts between the Ethernet protocol and the protocol employed on the home telephone network 203. Similarly, a second protocol conversion module 705 converts between the Ethernet protocol and the protocol employed on the wireless network. Other non-wireless controllers/ports may also be provided on the telephone access point 700 such as, for example, USB ports and/or Firewire™ ports.

It should be noted that an Ethernet controller 701 is illustrated in FIG. 7 and not FIG. 6 simply for the purpose of clarity. The Ethernet controller 701 may also be configured within the telephone/access point 600 shown in FIG. 6 while still complying with the underlying principles of the invention. In addition, in one embodiment, multiple wireless controllers/transceivers may be configured within the same telephone/access point. For example, in one embodiment, a Bluetooth wireless controller/transceiver is employed in the same telephone/access point as an 802.11a, b, g wireless controller/transceiver, thereby providing both Bluetooth and 802.11a, b, g connectivity to local wireless devices.

In addition, other types of decoder and signal processing modules may be employed within the telephone/access point while still complying with the underlying principles of the invention. For example, in one embodiment, an MPEG-2 decoder is configured within the telephone/access point 600, 700 to decode video content stored on the home media server 110. In this embodiment, a video output port (in addition to the audio output port) is also configured on the telephone/access point.

Moreover, although illustrated in FIGS. 6 and 7 as a plurality of individual modules, a single logical unit such as a single integrated circuit chip may be employed. Alternatively, the plurality of modules may be implemented as software executed by a general purpose or special purpose processor. In fact, any combination of hardware and software may be employed while still complying with the underlying principles of the invention.

As mentioned above, in one embodiment, a high speed Internet connection such as DSL or cable modem is provided by the media server 110. In this embodiment, external devices may access the high speed Internet connection via the telephony device/access point 600, 700 and the home telephone network 203. In this configuration, the home media server 110 performs the functions of a gateway to the Internet for all devices communicating over the home telephone network 203.

Alternatively, in one embodiment, the DSL or other high speed Internet connection is provided through a telephone/access point 600, 700. For example, in one embodiment, a DSL modem is coupled directly to the Ethernet port 710 to provide Internet services for all devices on the home telephone network 203 and/or for devices directly coupled to the telephone/access point (e.g., either wirelessly or via a second Ethernet port). Alternatively, a DSL or cable modem may be configured directly within the access point 600, 700. In this embodiment, the home media server 110 may access the Internet via the telephone/access point 600, 700.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments described above are employed within the context of a "home telephone network," the underlying principles of the invention may be employed using virtually any physical media (e.g., a coaxial network, an AC powerline network, . . . etc). Moreover, while the network described above uses the HPNA standard to transmit/receive data, various other protocols may be used while still complying with the underlying principles of the invention. Accordingly, the scope and spirit of the invention should be judged in terms of the claims which follow.

What is claimed is:

1. An apparatus comprising:
    a network interface module to provide data communication over a local network;
    a first network access point module to provide access to the local network by one or more external data processing devices, the first network access point module including a telephony module to enable audio telephony communication over the local network and supporting PSTN and IP telephony services;
    an audio decoder module to decode audio received over the local network;
    an audio output port to provide the decoded audio to an audio amplifier; and
    an infrared sensor to receive control signals from a remote control device and to transmit the control signals via the network interface module to the source of the audio content, the control signals indicating specific audio content to be provided over the local network,
    the telephony module comprising a power sensor to detect a drop in power below a threshold value to the IP telephony service,
    wherein the telephony module is to switch from the IP telephony service to the PSTN service prior to initiating an audio telephony communication upon detecting the drop in power below the threshold value.

2. The apparatus in claim 1 wherein the local network is a local telephone network.

3. The apparatus in claim 2 wherein the network interface module comprises Home Phoneline Networking Alliance ("HPNA") hardware and/or software for implementing the HPNA protocol over the local telephone network.

4. The apparatus as in claim 1 wherein the first network access point module comprises a wireless controller and transceiver to provide wireless access to the local network for the external data processing devices.

5. The apparatus as in claim 1 further comprising a second access point module to provide access to the local network by one or more external data processing devices, the second access point module employing a different networking protocol than the first access point module to communicate with the one or more external data processing devices.

6. The apparatus as in claim 5 wherein the first access point module comprises a wireless LAN controller and the second access point module comprises an Ethernet controller.

7. The apparatus as in claim 6 wherein the wireless LAN controller comprises an 801.11a, b or g controller.

8. The apparatus as in claim 5 wherein the first access point module comprises a Bluetooth controller and wherein the second access point module comprises an 802.11a, b or g controller.

9. The apparatus as in claim 1 further comprising:
    an audio decoder module to decode audio data received over the local network; and
    a digital output port to provide the decoded audio data to an audio amplifier.

10. The apparatus of claim 1, wherein the IP telephony service includes a local server and the power sensor is to detect a drop in power below a threshold value to the local server.

11. The apparatus of claim 1, wherein the power sensor is to detect a rise in power above the threshold value and the telephony module further to select the IP telephony service upon detecting the rise in power above the threshold value.

12. An apparatus comprising:
    telephony circuitry electrically coupled to a telephone network, the telephony circuitry to transmit and receive telephone signals over the local telephone network, the telephony circuitry including,
        PSTN telephony circuitry for transmitting and receiving PSTN telephony signals over the local telephone network,
        IP telephony circuitry, including a local server for transmitting and receiving IP telephony signals over the local telephone network, and
    selection logic to select between the IP telephony circuitry and the PSTN telephony circuitry, the selection logic comprising a power sensor to detect a drop in power below a threshold value to the local server, and wherein the selection logic is to switch from the IP telephony circuitry to the PSTN telephony circuitry prior to initiating an audio telephony communication upon detecting the drop in power below the threshold value;
    a first network controller electrically coupled to the telephone network, the network controller to transmit and receive digital data signals over the local telephone network;
    a second network controller communicatively coupled to one or more external devices, wherein the second network controller provides access to the local telephone network to the one or more external devices via a first communication interface coupling the second network controller with the first network controller, and
    a third network controller to communicate with one or more additional external devices according to a non-wireless communications protocol,
    wherein the third network controller provides access to the local telephone network to the one or more additional external devices via a second communication interface coupling the third network controller with the first network controller,
    wherein the first network controller transmits and receives data signals over the local telephone network according to the Home Phoneline Networking Alliance ("HPNA") protocol,
    wherein the second network controller is a wireless network controller communicating with the one or more external devices according to a wireless communications protocol, and
    wherein the non-wireless communications protocol is Ethernet.

13. The apparatus as in claim 12 wherein the first communication interface comprises a protocol conversion module to convert between the HPNA protocol and the wireless protocol.

14. The apparatus as in claim 12 further comprising:
    an audio processor to decode audio content transmitted from an audio source over the local telephone network; and
    an audio output to provide decoded audio content to an audio amplifier.

15. The apparatus as in claim 12 further comprising:
    a telephony headset electrically coupled to the telephony circuitry, the telephony headset to transmit and receive audio content from the telephony circuitry and the render audio received from the audio telephony circuitry.

16. The apparatus as in claim 12 wherein one of the external devices comprises a personal computer.

17. The apparatus as in claim 12 wherein one of the external devices comprises a PDA.

18. The apparatus as in claim 12 wherein one of the external devices comprises a cellular telephone.

19. The apparatus of claim 12, wherein the power sensor is to detect a rise in power above the threshold value and wherein the selection logic selects the IP telephony server upon detecting the rise in power above the threshold value.

20. An apparatus comprising:
  network interface means for providing data communication over a local network;
  first access point means for providing access to the local network by one or more external data processing devices, the access point means including telephony means for enabling audio telephony communication over the local network and supporting PSTN and IP telephony services, the IP telephony service including a local server;
  audio decoder means to decode audio received over the local network;
  audio output means to provide the decoded audio to an audio amplifier; and
  control signal processing means to receive control signals from a remote control device and to transmit the control signals via the network interface module to the source of the audio content, the control signals indicating specific audio content to be provided over the local network,
  the telephony means comprising power sensing means to detect a drop in power below a threshold value to the local server, and wherein the telephony means is to switch from the IP telephony service to the PSTN service prior to initiating an audio telephony communication upon detecting the drop in power below the threshold value.

21. The apparatus as in claim 20 wherein the local network is a local telephone network.

22. The apparatus in claim 21 wherein the network interface means comprises Home Phoneline Networking Alliance ("HPNA") hardware and/or software for implementing the HPNA protocol over the local telephone network.

23. The apparatus in claim 20 wherein the first access point means comprises a wireless controller and transceiver for providing wireless access to the local network for the external data processing devices.

24. The apparatus as in claim 20 further comprising a second access point means to provide access to the local network by one or more external data processing devices, the second access point means employing a different networking protocol than the first access point means to communicate with the one or more external data processing devices.

25. The apparatus as in claim 24 wherein the first access point means comprises a Bluetooth controller and wherein the second access point means comprises an 802.11a, b or g controller.

26. The apparatus as in claim 24 wherein the first access point means comprises a wireless LAN controller and the second access point means comprises an Ethernet controller.

27. The apparatus as in claim 26 wherein the wireless LAN controller comprises an 802.11a, b or g controller.

28. The apparatus as in claim 20 further comprising:
  an audio decoder module to decode audio data received over the local network; and
  a digital output port to provide the decoded audio data to an audio amplifier.

29. The apparatus of claim 20, wherein the power sensing means is to detect a rise in power above the threshold value and the telephony means further to select the IP telephony service upon detecting the rise in power above the threshold value.

* * * * *